US012631320B1

(12) United States Patent
Li et al.

(10) Patent No.: US 12,631,320 B1
(45) Date of Patent: May 19, 2026

(54) DUAL-RESISTOR AIRTIGHT AND WATERPROOF BULB

(71) Applicant: Sichuan Jamie Charming Technology Co., Ltd., Nanchong City (CN)

(72) Inventors: Weiming Li, Nanchong City (CN); Weiguang Li, Nanchong City (CN); Zhimin Hu, Nanchong City (CN)

(73) Assignee: Sichuan Jamie Charming Technology Co., Ltd., Nanchong City (CN)

( * ) Notice: Subject to any disclaimer, the term of this patent is extended or adjusted under 35 U.S.C. 154(b) by 0 days.

(21) Appl. No.: 19/091,299

(22) Filed: Mar. 26, 2025

(30) Foreign Application Priority Data

Mar. 12, 2025 (CN) ......................... 202520428797.9

(51) Int. Cl.

| | |
|---|---|
| ***F21V 31/00*** | (2006.01) |
| ***F21K 9/232*** | (2016.01) |
| ***F21K 9/235*** | (2016.01) |
| ***F21K 9/238*** | (2016.01) |
| ***F21V 19/00*** | (2006.01) |
| *F21Y 103/10* | (2016.01) |
| *F21Y 115/10* | (2016.01) |

(52) U.S. Cl.
CPC ............ *F21V 31/005* (2013.01); *F21K 9/232* (2016.08); *F21K 9/235* (2016.08); *F21K 9/238* (2016.08); *F21V 19/0045* (2013.01); *F21Y 2103/10* (2016.08); *F21Y 2115/10* (2016.08)

(58) Field of Classification Search
CPC ........ F21V 31/005; F21K 9/232; F21K 9/235; F21K 9/238
See application file for complete search history.

(56) References Cited

U.S. PATENT DOCUMENTS

| | | | | |
|---|---|---|---|---|
| 11,293,596 | B1 * | 4/2022 | Wang | F21K 9/238 |
| 11,293,599 | B1 * | 4/2022 | Wang | F21V 31/005 |
| 11,635,173 | B1 * | 4/2023 | Wang | F21V 19/0015 313/271 |
| 12,315,715 | B1 * | 5/2025 | Li | H01K 1/62 |
| 2018/0156445 | A1 * | 6/2018 | Chen | F21V 29/85 |
| 2022/0136660 | A1 * | 5/2022 | Huang | F21K 9/232 362/363 |
| 2023/0084854 | A1 * | 3/2023 | Li | F21V 31/005 362/257 |
| 2024/0392933 | A1 * | 11/2024 | Wang | F21K 9/232 |

* cited by examiner

*Primary Examiner* — Tracie Y Green
*Assistant Examiner* — Michael Chiang
(74) *Attorney, Agent, or Firm* — AVEK IP, LLC

(57) ABSTRACT

Some embodiments of the disclosure relate to the technical field of lamps and disclose dual-resistor airtight and waterproof bulbs. In some examples, the stem structure incudes a waterproof rubber base and a vertical light source plate. The waterproof rubber base includes an upper insertion portion and a lower assembly portion which are formed integrally. The lower assembly portion is arranged at an opening of the lamp shade and fits the opening of the lamp shade to form a filling recess. The disclosure may improve the stem structure of existing LED lamps and enables a light strip to be inserted into the waterproof rubber base more easily to implement connection and electric conduction, such that the production process of the stem of lamps may be simplified, and the stem may be formed without repeated fixed-position welding, thus may effectively improve the forming efficiency of the lamps.

10 Claims, 6 Drawing Sheets

DUAL-RESISTOR AIRTIGHT AND WATERPROOF BULB

CROSS REFERENCE TO RELATED APPLICATIONS

This application claims priority to Chinese patent application number 2025204287979, filed on Mar. 12, 2025, the disclosure of which is incorporated by reference herein in its entirety.

FIELD OF THE DISCLOSURE

The disclosure relates to the technical field of lamps, in particular to dual-resistor airtight and waterproof bulbs.

BACKGROUND

LED bulbs, as novel energy-saving lighting equipment, are gradually replacing traditional lighting products all over the world and become the first choice of modern families and commercial lighting. A light emitting diode (LED) is a solid semiconductor device capable of directly converting electric energy into visible light. Since its emergency in 1960s, the LED technology witnesses a long-term development and shows remarkable advantages in the field of indoor lighting at present.

For existing LED bulbs, metal wires need to be welded to two ends of a light strip to implement electrical connection of the light strip and a threaded lamp base, such that fixed-position welding of the light strip has to be performed at least twice in the forming process of the bulbs. Such a bulb structure has high requirements for the production process, and the time for forming a single bulb is prolonged, leading to low production efficiency of bulbs. In addition, the waterproofness of existing LED bulbs is implemented by sealed connection between the threaded lamp base and a spherical lamp shade with glue, but it is found, in actual use of the bulbs, that moisture still easily enters the lamp shade from the outside, thus compromising the service life of the bulbs. Therefore, it is necessary to make further improvements on existing bulbs.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a dual-resistor airtight and waterproof bulb, including a threaded lamp base, a lamp shade and a stem structure. The threaded lamp base is fixedly connected to the lamp shade. The stem structure includes a waterproof rubber base and a vertical light source plate. The waterproof rubber base includes an upper insertion portion and a lower assembly portion which are formed integrally. The lower assembly portion is arranged at an opening of the lamp shade and fits the opening of the lamp shade to form a filling recess, and the filling recess is filled with a sealing rubber layer. The upper insertion portion is provided with a slot enabling the vertical light source plate to be assembled therein. At least two electric wires are arranged on an inner side of the slot. One of the electric wires is electrically connected to a positive pole of the threaded lamp base, and the other electric wire is electrically connected to a negative pole of the threaded lamp base. Heat-dissipation resistors are electrically connected to middle portions of the two electric wires respectively. The vertical light source plate at least includes a base plate and light-emitting beads arranged on two opposite surfaces of the base plate. The base plate is provided with two conductive contacts. The base plate has an end inserted into the slot and connecting the conductive contacts and the electric wires as well as an end extending into the lamp shade.

Optionally, the lower assembly portion is provided with receiving grooves for positioning and receiving the heat-dissipation resistors, and upper openings of the receiving grooves are connected to the slot.

Optionally, the slot includes a first side wall and a second side wall, and the upper openings are close to the first side wall or the second side wall.

Optionally, the first side wall is provided with a first protrusion or the second side wall is provided with a second protrusion, and the first protrusion or the second protrusion abuts against the base plate to keep the conductive contacts in close contact with the electric wires.

Optionally, the two electric wires extend out of the slot and are formed with bent portions.

Optionally, a positioning block used for auxiliary positioning of the waterproof rubber base is arranged at a top end of the upper insertion portion.

Optionally, the base plate is made of PVC.

Optionally, the base plate is T-shaped and includes an inserted portion and a light source portion, and the inserted portion is inserted into the slot and is wider than the light source portion. The light-emitting beads are arranged on the light source portion.

Optionally, the conductive contacts are elongated and arranged on a surface of the inserted portion.

Optionally, linear chamfers are arranged on two sides of an end of the inserted portion.

BRIEF DESCRIPTION OF THE DRAWINGS

Illustrative embodiments of the present disclosure are described in detail below with reference to the attached drawing figures.

Figure 1:
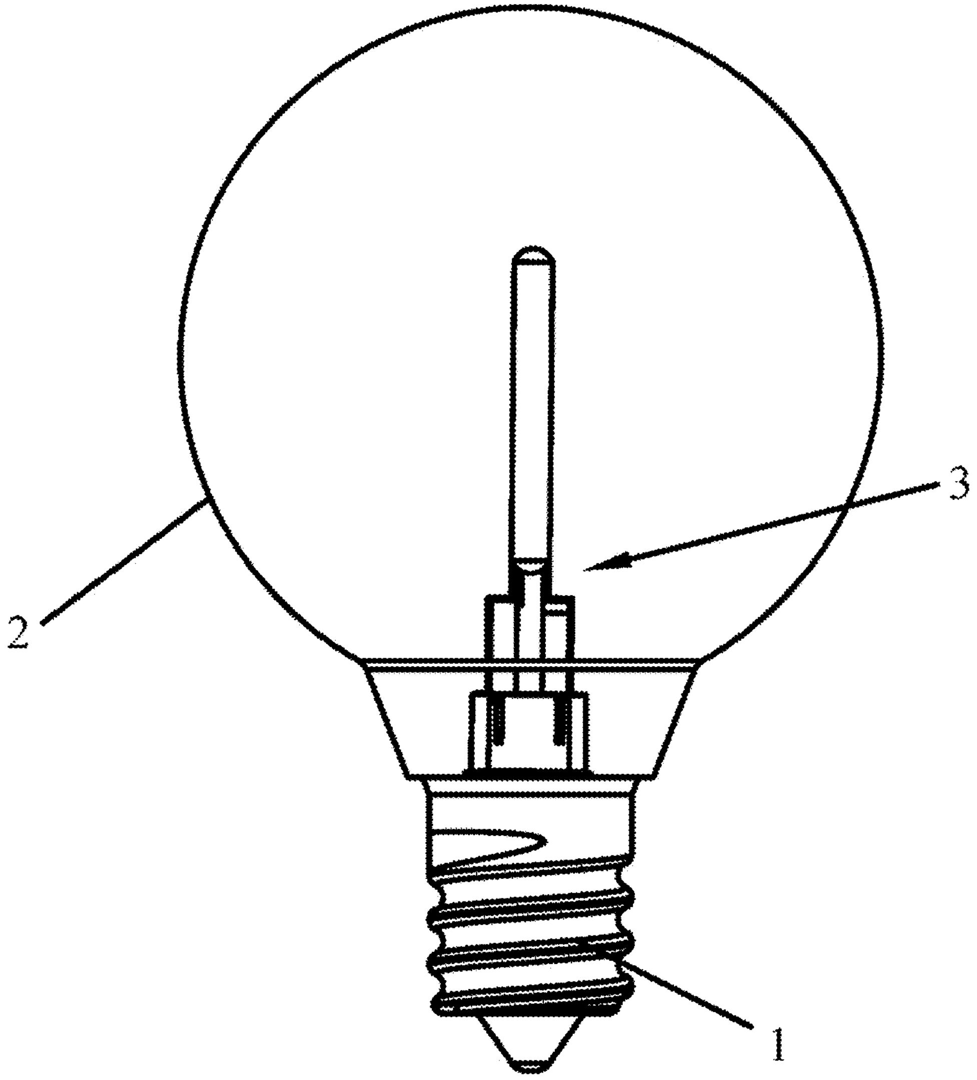
FIG. 1 is an overall structural diagram according to the disclosure.
Figure 2:
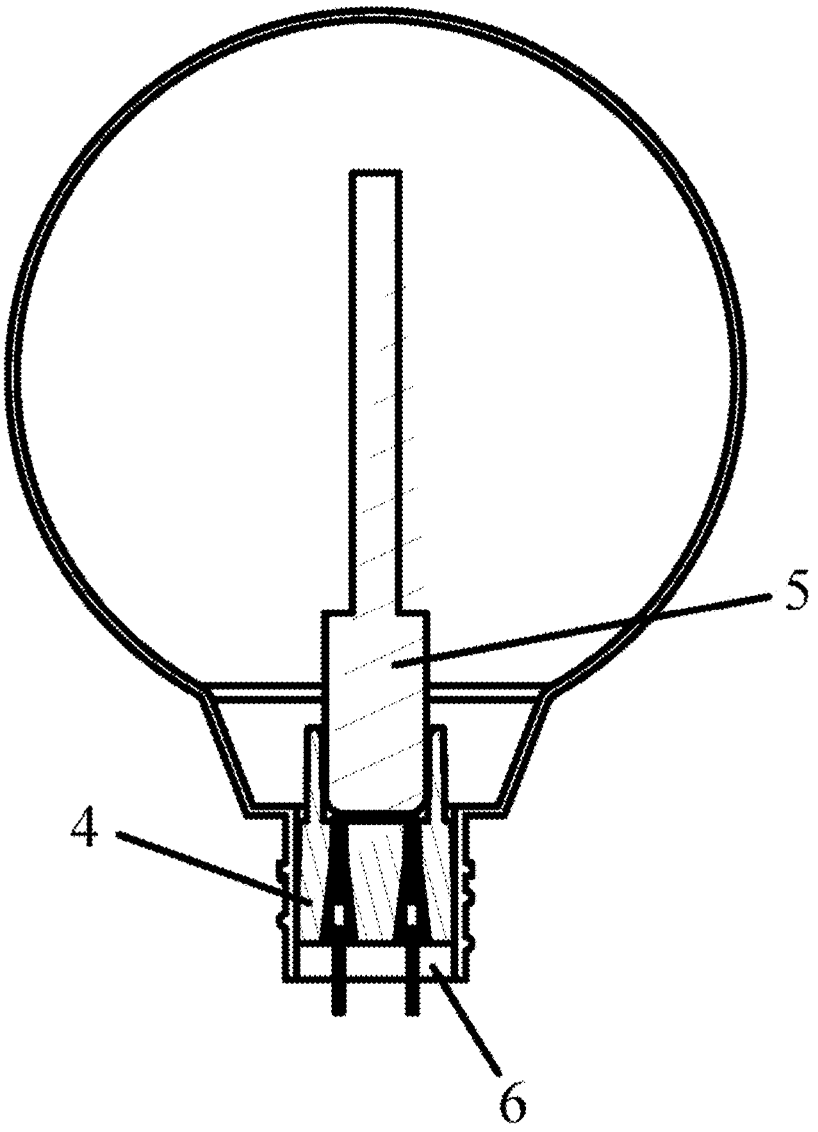
FIG. 2 is a structural diagram of a filling recess according to the disclosure.
Figure 3:
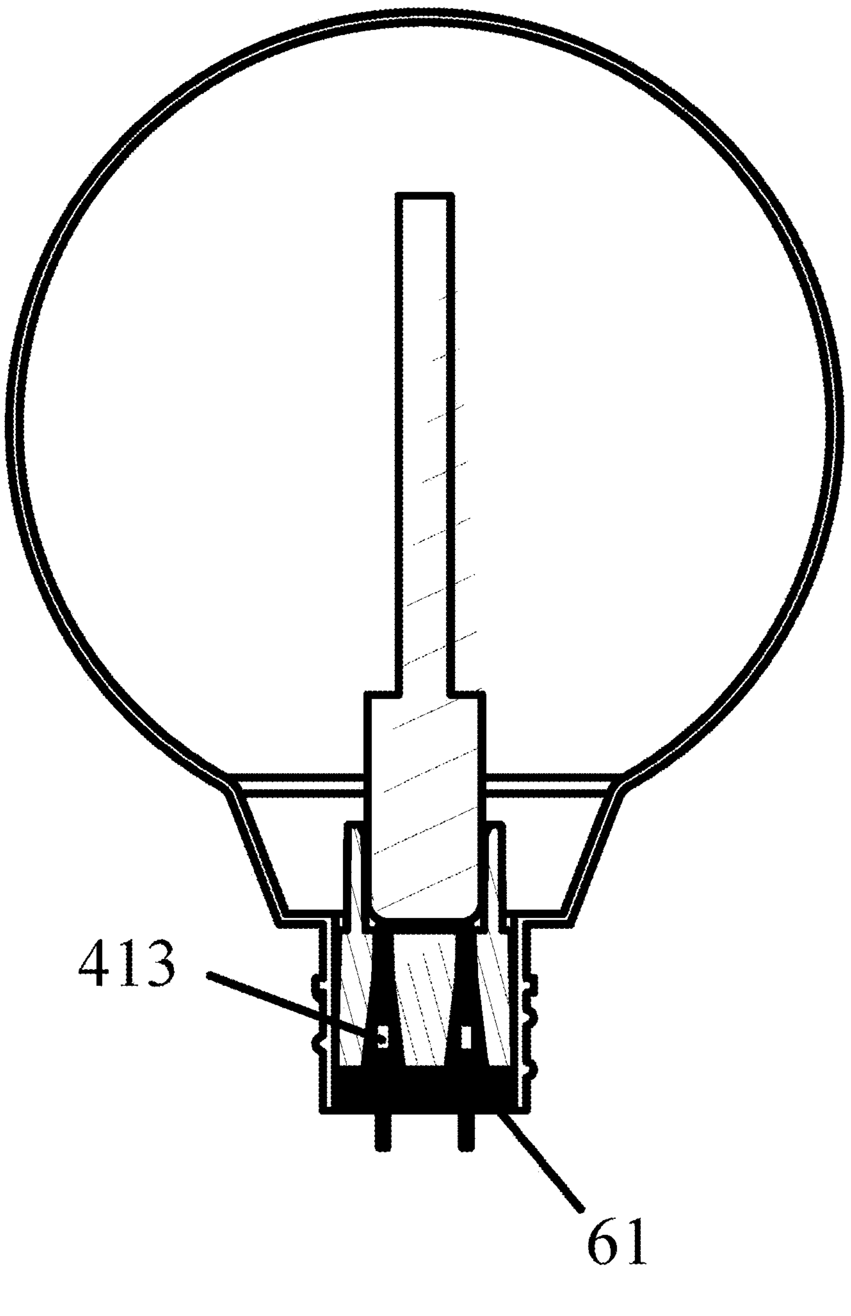
FIG. 3 is a structural diagram of a sealing rubber layer according to the disclosure.
Figure 4:
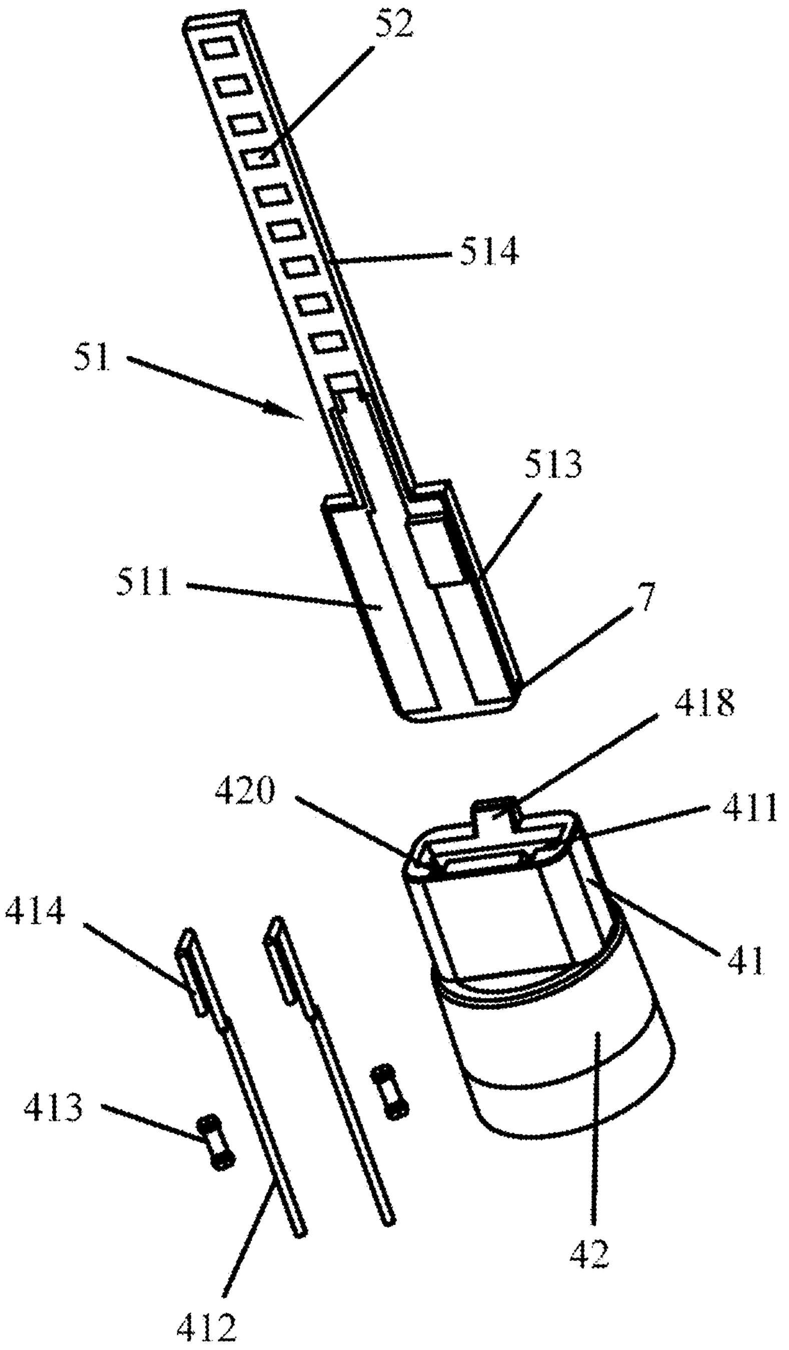
FIG. 4 is an exploded structural diagram of a stem structure according to the disclosure.

Reference numbers: 1, threaded lamp base; 2, lamp shade; 3, stem structure; 4, waterproof rubber base; 41, upper insertion portion; 411, slot; 412, electric wire; 413, heat-dissipation resistor; 414, bent portion; 415, first side wall; 416, second side wall; 417, first protrusion; 418, positioning block; 419, second protrusion; 420, notch; 42, lower assembly portion; 421, receiving groove; 422, upper opening; 5, vertical light source plate; 51, base plate; 511, conductive contact; 513, inserted portion; 514, light source portion; 52, light-emitting bead; 6, filling recess; 61, sealing rubber layer; and 7, linear chamfer.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The disclosure is described in detail below in conjunction with FIGS. 1-6.

The disclosure provides a dual-resistor airtight and waterproof bulb, including a threaded lamp base 1, a lamp shade 2 and a stem structure 3. The threaded base 1 is fixedly connected to the lamp shade 2, and the stem structure 3 may include a waterproof rubber base 4 and a vertical light source plate 5. The waterproof rubber base 4 may include an upper insertion portion 41 and a lower assembly portion 42 which are formed integrally. The lower assembly portion 42 is arranged at an opening of the lamp shade 2 and fits the opening of the lamp shade 2 to form a filling recess 6, and the filling recess 6 is filled with a sealing rubber layer 61. The upper insertion portion 41 is provided with a slot 411 enabling the vertical light source plate 5 to be assembled therein. At least two electric wires 412 are arranged on an inner side of the slot 411. One of the electric wires 412 is electrically connected to a positive pole of the threaded lamp base 1, and the other electric wire 412 is electrically connected to a negative pole of the threaded lamp base 1. Heat-dissipation resistors 413 are electrically connected to middle portions of the two electric wires 412 respectively. The vertical light source plate 5 may at least include a base plate 51 and light-emitting beads 52 arranged on two opposite surfaces of the base plate 51. The base plate 51 is provided with two conductive contacts 511. One end of the base plate 51 is inserted into the slot 411 and connects the conductive contacts 511 and the electric wires 412, and the other end of the base plate 51 extends into the lamp shade 2.

The disclosure may have one or more of the following advantages: 1, the stem structure of existing LED lamps may be improved, and a light strip is more easily inserted into the waterproof rubber base to implement connection and electric conduction, such that the production process of the stem of lamps is simplified, and the stem may be formed without repeated fixed-position welding, thus effectively improving the forming efficiency of the lamps; 2, the sealing rubber layer is adaptively arranged between the lamp shade and the waterproof rubber base ad completely isolates moisture outside the lamp shade, thus greatly improving the waterproofness of lamps and prolonging the service life of the lamps; 3, the technical solution adopts a dual-resistor scheme, which may further seal the waterproof rubber base, position the electric wires and omit the process of welding resistors to the vertical light source plate, thus further reducing the production cost.

According to an embodiment of the disclosure, the lower assembly portion 42 is provided with receiving grooves 421 for positioning and receiving the heat-dissipation resistors 413, and upper openings 422 of the receiving grooves 421 are connected to the slot 411. When the heat-dissipation resistors 413 are placed in the receiving grooves 421, the electric wires 412 are positioned.

Figure 5:
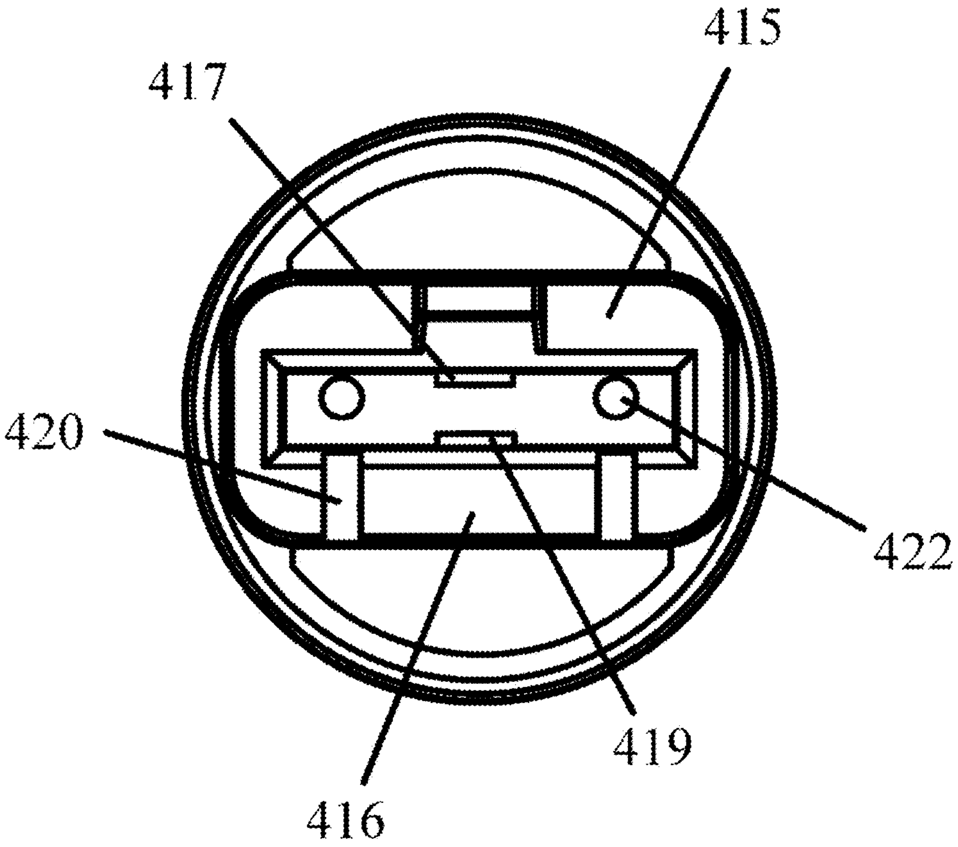
FIG. 5 is an internal structural diagram of a slot according to the disclosure.
Figure 6:
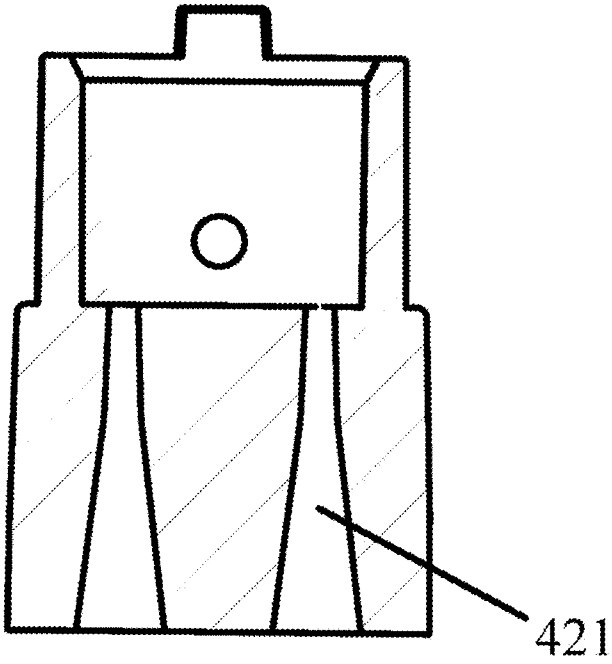
FIG. 6 is an internal structural diagram of a waterproof rubber base according to the disclosure.

Optionally, the slot 411 may include a first side wall 415 and a second side wall 416, and the upper openings 422 are close to the first side wall 415 or the second side wall 416. As shown in FIG. 5, the upper openings 422 are close to a front or back side of the slot 411 rather than being located in the middle of the slot 411, such that the receiving grooves 421 deviate from the middle. In this way, the vertical light source plate 5 will not collide with the electric wires 412 during production and assembly and may be smoothly inserted into the slot 411.

As a further improvement, the first side wall 415 may be provided with a first protrusion 417 or the second side wall 416 is provided with a second protrusion 419, and the first protrusion 417 or the second protrusion 419 may abut against the base plate 51 to keep the conductive contacts 511 in close contact with the electric wires 412.

Optionally, the two electric wires 412 extend out of the slot 411 and are formed with bent portions 414, and the electric wires 412 hook the side walls of the slot 411 to be positioned and mounted. In addition, the arc bent portions formed by bending the electric wires 412 are elastic to keep the electric wires 412 in close contact with the conductive contacts 511, such that good conductive contact of the electric wires 412 is guaranteed. To further position the bent portions 414, small notches 420 are formed in tops of the side walls of the slot 411, and the bent portions 414 are received in the small notches 420 to be positioned.

In this example, a positioning block 418 is arranged at a top end of the upper insertion portion 41. When a lamp stem is assembled, an automatic device may position the waterproof rubber base 4 easily by means of the positioning block 418, thus effectively improving the assembly efficiency of the lamp stem.

A traditional base plate 51 is generally made of ceramic and is prone to breakage, leading to a short service life. In view of this, the inventor proposes, by study, the base plate 51 made of PVC. Compared with the ceramic base plate 51, the PVC base plate 51 has better tenacity, is not prone to bending and breakage and has a longer service life.

According to an embodiment of the disclosure, the base plate 51 is T-shaped and may include an inserted portion 513 and a light source portion 514. The inserted portion 513 is inserted into the slot 411 and is wider than the light source portion 514 to expand the contact area between the inserted portion 513 and the slot 411, such that the light source portion 514 may be stably supported by the inserted portion 513. The light-emitting beads 52 are arranged on the light source portion 514.

Optionally, the conductive contacts 511 are elongated and arranged on the surface of the inserted portion 513. The elongated conductive contacts 511 correspond to the strip-shaped electric wires 412, such that the conductive contacts 511 and the electric wires 412 may be electrically connected more easily.

Optionally, linear chamfers 7 are arranged on two sides of an end of the inserted portion 513, such that arc-shaped buffer legs are formed in bottom ends of two sides of the inserted portion 513. When the inserted portion 513 is assembled and inserted into the slot 411, a buffer space will be reserved, and the inserted portion 513 may be assembled into the slot 411 more smoothly, and the size range of the slot 411 adaptive to the inserted portion 513 is expanded.

The above embodiments are merely preferred ones of the disclosure. Those ordinarily skilled in the art may make some modifications to the specific implementation and application range of the disclosure according to the concept of the disclosure. The description here should not be construed as a limitation of the disclosure.

Some embodiments, compared with the prior art, of the dual-resistor airtight and waterproof bulb provided by the disclosure may have one or more of the following beneficial effects: 1, the stem structure of existing LED lamps may be improved, and a light strip may be more easily inserted into the waterproof rubber base to implement connection and electric conduction, such that the production process of the stem of lamps may be simplified, and the stem may be formed without repeated fixed-position welding, thus effectively improving the forming efficiency of the lamps; 2, the sealing rubber layer may be adaptively arranged between the lamp shade and the waterproof rubber base ad completely isolates moisture outside the lamp shade, thus greatly improving the waterproofness of lamps and prolonging the service life of the lamps; 3, the technical solution adopt a dual-resistor scheme, which may further seal the waterproof rubber base, position the electric wires and omit the process of welding resistors to the vertical light source plate, thus further reducing the production cost.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The invention claimed is:

1. A dual-resistor airtight and waterproof bulb, comprising a threaded lamp base (1), a lamp shade (2) and a stem structure (3), the threaded lamp base (1) being connected to the lamp shade (2), wherein:

the stem structure (3) comprises a waterproof rubber base (4) and a vertical light source plate (5);

the waterproof rubber base (4) comprises an upper insertion portion (41) and a lower assembly portion (42) which are formed integrally, the lower assembly portion (42) is arranged at an opening of the lamp shade (2) and fits the opening of the lamp shade (2) to form a filling recess (6), and the filling recess (6) is filled with a sealing rubber layer (61);

the upper insertion portion (41) is provided with a slot (411) enabling the vertical light source plate (5) to be assembled therein;

at least two electric wires (412) are arranged on an inner side of the slot (411);

one of the electric wires (412) is electrically connected to a positive pole of the threaded lamp base (1), and another one of the electric wires (412) is electrically connected to a negative pole of the threaded lamp base (1);

heat-dissipation resistors (413) are electrically connected to middle portions of the two electric wires (412);

the vertical light source plate (5) comprises a base plate (51) and light-emitting beads (52) arranged on two opposite surfaces of the base plate (51); and the base plate (51) is provided with two conductive contacts (511), and the base plate (51) has an end inserted into the slot (411) and connecting the conductive contacts (511) and the electric wires (412) as well as an end extending into the lamp shade (2).

2. The dual-resistor airtight and waterproof bulb according to claim 1, wherein:

the lower assembly portion (42) is provided with receiving grooves (421) for positioning and receiving the heat-dissipation resistors (413); and upper openings (422) of the receiving grooves (421) are connected to the slot (411).

3. The dual-resistor airtight and waterproof bulb according to claim 2, wherein:

the slot (411) comprises a first side wall (415) and a second side wall (416); and the upper openings (422) are close to the first side wall (415) or the second side wall (416).

4. The dual-resistor airtight and waterproof bulb according to claim 3, wherein:

the first side wall (415) is provided with a first protrusion (417) or the second side wall (416) is provided with a second protrusion (419); and the first protrusion (417) or the second protrusion (419) abuts against the base plate (51) to keep the conductive contacts (511) in close contact with the electric wires (412).

5. The dual-resistor airtight and waterproof bulb according to claim 1, wherein the two electric wires (412) extend out of the slot (411) and are formed with bent portions (414).

6. The dual-resistor airtight and waterproof bulb according to claim 1, wherein a positioning block (418) used for auxiliary positioning of the waterproof rubber base (4) is arranged at a top end of the upper insertion portion (41).

7. The dual-resistor airtight and waterproof bulb according to claim 1, wherein the base plate (51) is made of PVC.

8. The dual-resistor airtight and waterproof bulb according to claim 1, wherein:

the base plate (51) is T-shaped and comprises an inserted portion (513) and a light source portion (514);

the inserted portion (513) is inserted into the slot (411) and is wider than the light source portion (514); and the light-emitting beads (52) are arranged on the light source portion (514).

9. The dual-resistor airtight and waterproof bulb according to claim 8, wherein the conductive contacts (511) are elongated and arranged on a surface of the inserted portion (513).

10. The dual-resistor airtight and waterproof bulb according to claim 8, wherein linear chamfers (7) are arranged on two sides of an end of the inserted portion (513).

* * * * *